United States Patent [19]

Cairns

[11] Patent Number: 4,606,603

[45] Date of Patent: * Aug. 19, 1986

[54] UNDERWATER CONNECTOR INCLUDING INTEGRAL BLADDER AND SEAL WITH A SET OF CONSTRICTING MEANS

[75] Inventor: James L. Cairns, Mims, Fla.

[73] Assignee: Lockheed Corporation, Burbank, Calif.

[*] Notice: The portion of the term of this patent subsequent to Feb. 15, 2000 has been disclaimed.

[21] Appl. No.: 482,919

[22] Filed: Apr. 7, 1983

[51] Int. Cl.[4] ............. G02B 6/38; H01R 4/00
[52] U.S. Cl. .............. 350/96.21; 350/96.18; 350/96.20; 339/94 C; 339/117 R; 339/177 R; 174/70 R
[58] Field of Search ............... 350/96.10, 96.15, 96.20, 350/96.18, 96.21, 96.22, 96.23; 339/89 R, 89 M, 117 R, 177 R, 94 C, 94 R, 94 A, 103 R, 103 B; 174/70 R, 70 S

[56] References Cited

U.S. PATENT DOCUMENTS

| | | | |
|---|---|---|---|
| 2,656,403 | 10/1953 | Sealey | 339/103 B |
| 3,643,207 | 2/1972 | Cairns | 339/96 |
| 3,883,681 | 5/1975 | Cambell | 350/96.2 |
| 4,081,208 | 3/1978 | Meade | 350/96.2 |
| 4,085,993 | 4/1978 | Cairns | 339/94 M |
| 4,185,886 | 1/1980 | Corrales | 350/96.21 |
| 4,214,809 | 7/1980 | Reh | 350/96.2 |
| 4,217,028 | 8/1980 | Reh et al. | 350/96.2 |
| 4,295,707 | 10/1981 | Nakai et al. | 350/96.2 |
| 4,345,816 | 8/1982 | Nakai et al. | 350/96.2 |
| 4,373,767 | 2/1983 | Cairns | 339/117 R |
| 4,373,777 | 2/1983 | Borsuk et al. | 350/96.2 |
| 4,411,491 | 10/1983 | Larkin et al. | 350/96.2 |
| 4,447,115 | 5/1984 | Guazzo et al. | 350/96.2 |
| 4,469,399 | 9/1984 | Cowen et al. | 350/96.20 |

*Primary Examiner*—William L. Sikes
*Assistant Examiner*—Brian M. Healy
*Attorney, Agent, or Firm*—Brown, Martin & Haller

[57] ABSTRACT

A plug and socket type connector for making underwater electrical and/or fiber optical connections. The female part of the connector contains one or more sockets enclosed in a dielectric fluid filled bladder having a penetrable seal. The optical index of refraction of the fluid is controlled. The male part of the connector has an extended probe of round cross-section which penetrates the seal to mate with the sockets and complete the electrical and/or fiber optic connections. The penetrable seal is specially designed to accommodate repeated insertion and withdrawal of the probe without loss of fluid compound or water leakage. The seal includes an elastomeric sleeve integrally molded to one end of the bladder. The sleeve extends axially through a flat slit in a surrounding elastomeric grommet. A tensioned elastomeric constricting ring surrounds the grommet and squeezes the sleeve into a flattened closed condition upon withdrawal of the probe.

43 Claims, 10 Drawing Figures

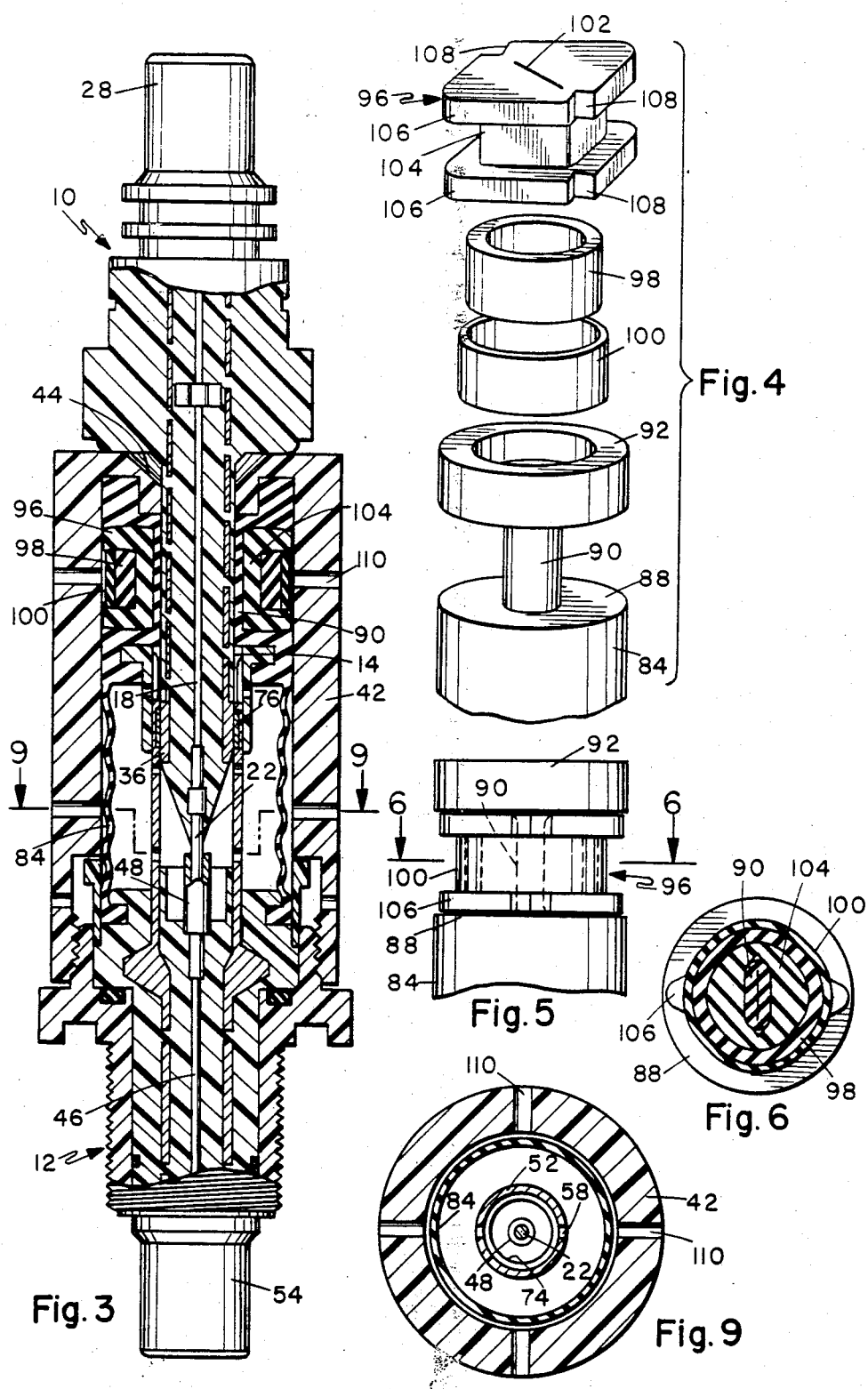

UNDERWATER CONNECTOR INCLUDING INTEGRAL BLADDER AND SEAL WITH A SET OF CONSTRICTING MEANS

BACKGROUND OF THE INVENTION

The present invention relates to electrical and fiber optic connectors, and more particularly, to a device for connecting coaxial or fiber optic cables which will not allow entry of seawater during underwater connection and disconnection.

In my U.S. Pat. No. 4,373,767, there is disclosed an underwater coaxial connector in which the female part of the connector contains a socket element enclosed in a dielectric fluid filled chamber. The chamber has a special seal at one end through which the contact probe of the mating male part of the connector is inserted. The penetrable seal is specifically designed to accommodate repeated insertion and withdrawal of a male probe of round cross-section without loss of dielectric fluid or water leakage. The seal includes an elongated cylindrical sleeve made of an elastomeric material. The sleeve extends through an axial slit in a cylindrical resilient constrictor member that flattens out and closes the cylindrical sleeve.

While the underwater coaxial connector of my U.S. Pat. No. 4,373,767 represents a significant improvement over prior art underwater coaxial connectors, it does have certain aspects which have been improved upon in my subject invention described hereafter. More specifically, in my underwater coaxial connector of my U.S. Pat. No. 4,373,767, the sleeve and bladder are separate parts and this results in more sealing points than if the sleeve and bladder were made in one piece. Furthermore, in my aforementioned patented connector, the seal is closed by a single cylindrical constrictor compressed against the interior walls of the body portion of the female unit. In some cases, the constrictor has a tendency to take a "compression set" after the probe has been inserted for some time. When the probe is withdrawn, there may be a tendency for the constrictor to not completely return to its original condition fast enough and therefore the sleeve extending through its slit may not completely close. The sealing capability of the cylindrical constrictor in my aforementioned patented connector depended to some extent upon its contact with the interior wall of the hollow body of the female unit. Thus close tolerances between the body and the constrictor were required.

In addition, my coaxial connector described in U.S. Pat. No. 4,373,767 did not anticipate the inclusion of a fiber optics contact, and the present invention does.

SUMMARY OF THE INVENTION

Accordingly, it is the primary object of the present invention to provide an improved underwater connector.

Another object of the present invention is to provide an improved underwater electrical connector.

Another object of the present invention is to provide an improved underwater fiber optic connector.

Another object of the present invention is to provide an underwater fiber optic connector in which optical connections are made within a fluid medium of controlled refractive index.

Another object of the present invention is to provide an underwater connector having an improved penetrable seal which can be used repeatedly without risk of water or internal fluid compound leakage.

Another object of the present invention is to provide an underwater connector which can be readily mounted on a bulkhead.

Another object of the present invention is to provide an underwater connector which has an improved internal reinforcing construction.

Still another object of the present invention is to provide an underwater connector for simultaneously making electrical and optical connections.

Accordingly, the present invention provides a plug and socket type connector for making underwater electrical and/or fiber optical connections. The female part of the connector contains a socket enclosed in a fluid compound filled bladder having a penetrable seal. The male part of the connector has an extended probe of round cross-section which penetrates the seal to mate with the socket and complete the electrical and/or fiber optic connections. The penetrable seal is specially designed to accommodate repeated insertion and withdrawal of the probe without loss of fluid compound or water leakage. The seal is also especially designed to wipe the male probe clean during penetration in order to maintain its cleanliness as well as the purity of the filler fluid. The seal includes an elastomeric sleeve integrally molded to one end of the bladder. The sleeve extends axially through a flat slit in a surrounding elastomeric grommet. A tensioned elastomeric constricting ring surrounds the grommet and squeezes the sleeve into a flattened closed condition upon withdrawal of the probe.

BRIEF DESCRIPTION OF THE DRAWINGS

FIG. 3 is a longitudinal cross-sectional view, on a reduced scale, illustrating the mating connection of the male and female units of the first embodiment of my underwater connector.

FIG. 4 is an exploded view of the components of the seal of the first embodiment of my underwater connector which is penetrated by the probe of the male unit.

FIG. 5 is a fragmentary, side elevational view of the seal and bladder combination of the first embodiment of my underwater connector.

FIG. 6 is a sectional view taken along line 6—6 of FIG. 5. The seal is illustrated in its closed condition after the probe has been withdrawn.

FIG. 9 is a sectional view taken along line 9—9 of FIG. 3.

DESCRIPTION OF THE PREFERRED EMBODIMENT

A first embodiment of my underwater connector as illustrated and described herein is designed to connect coaxial cable. It comprises a male unit 10 and a female unit 12, illustrated in detail in FIGS. 1 and 2, respectively. The two units interconnect to form an integral cylindrical connector, as illustrated in FIG. 3.

Figures 1, 2, 10:
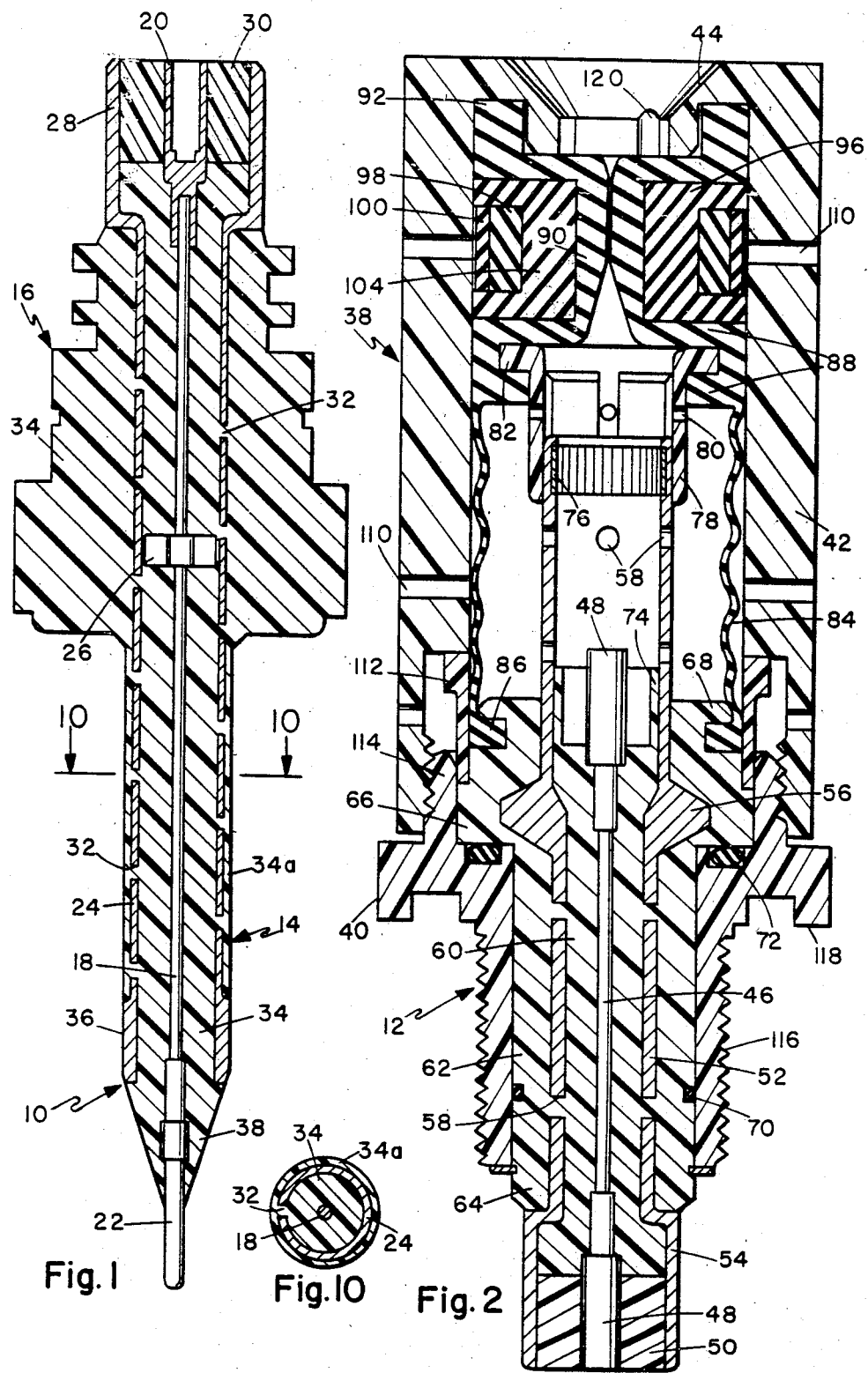
FIG. 1 is a longitudinal cross-sectional view of the male unit of a first embodiment of my underwater connector which is adapted for connecting coaxial cable.
FIG. 2 is a longitudinal cross-sectional view of the female unit of the first embodiment of my underwater connector.
FIG. 10 is a sectional view taken along line 10—10 of FIG. 1.

Referring to FIG. 1, the male unit 10 has an elongated cylindrical conductive contact probe 14 and a generally cylindrical, rearwardly diminishing base 16 which surrounds the rearward portion of the contact probe. The contact probe includes a conductive rod 18 which has a socket 20 crimped on its rearward end and a rounded insertion terminal 22 crimped on its forward end. The conductive rod extends concentrically through the interior of a cylindrical male outer conductor 24 which is also made of an electrical conductor such as beryllium copper. The rod 18 extends through a rigid dielectric spacer 26 positioned roughly intermediate the length of the outer conductor 24. The rearward portion 28 of the outer conductor is enlarged and a TEFLON (Trademark) spacer 30 surrounds the socket 20 and fits tightly into the rearward portion 28 of the outer conductor. The spacers 26 and 30 thus hold the rod 18, socket 20 and insertion terminal 22 in concentric alignment within the outer conductor 24.

The insertion terminal 22 (FIG. 1) projects beyond the forward end of the outer conductor. The smaller diameter portion of the outer conductor has a plurality of longitudinally spaced holes 32 formed therein. Once the rod 18, socket 20, insertion terminal 22 and spacers 26 and 30 have been assembled, these components are bonded together in a mold by a rigid dielectric material such as a thermoset reinforced epoxy 34. The epoxy 34 fills the interior of the male outer conductor 24 and also forms the base 16. Thus the hardened epoxy 34 within the outer conductor extends through the holes 32 therein to integrally join with the epoxy 34 which comprises the base 16.

The forward end 36 (FIG. 1) of the outer conductor is slightly enlarged and exposed. The portion of the outer conductor which extends between the forward end 36 and the base 16 is covered by a thin layer 34a of epoxy which serves as a layer of insulation. In the molding process referred to above, the epoxy 34 forward of the outer conductor 24 is molded into a projection 38 which tapers into the insertion terminal 22. The central conductor of a coaxial cable (not shown) is connected to the socket 20 and the outer ground conductor of the coaxial cable is connected to the enlarged portion 28 of the outer conductor through conventional means not described herein.

Referring to FIG. 2, the female unit 12 of the first embodiment of my underwater connector includes a hollow outer body generally designated 38. The body includes a plastic or metal back shell 40 onto which is screwed the internally threaded end of a cylindrical, hollow plastic or metal receptacle 42. The forward end of the receptacle has a tapered opening 44 to guide the contact probe 14 of the male unit as its forward end is inserted into the interior of the hollow receptacle.

The components of the female unit 12 which establish electrical contact with the probe 14 of the male unit will now be described. A conductive rod 46 (FIG. 2) has conductive sockets 48 crimped to its forward and rearward ends. A cylindrical TEFLON spacer 50 is tightly fit over the rearward socket 48. The rod 46 is positioned within a cylindrical female outer conductor 52. This conductor has an enlarged rearward portion 54 and an outwardly extending, tapered annular shoulder 56 intermediate its length. The female outer conductor 52 further has a plurality of longitudinally spaced holes 58 therein. The spacer 50 is snugly fit within the enlarged rearward portion 54 of the female outer conductor which concentrically positions the rod 46 and sockets 48 within this outer conductor.

The sub-assembly consisting of the rod 46, sockets 48, spacer 50 and female outer conductor 52 are placed in a mold and are rigidly bonded together with a rigid dielectric material such as a thermoset reinforced epoxy 60. This epoxy fills the rearward half of the outer conductor 52 and also forms an outer insulative spool 62 which surrounds the female conductor 52. The hardened epoxy 60 within the female conductor and the epoxy which forms the spool 62 are integrally connected through the holes 58 in the female outer conductor. The spool has a cylindrical rear portion 64 and a forward shoulder portion 66. The spool also has an annular retaining lip 68 which extends from the forward end of the spool.

The back shell 40 fits snugly over the cylindrical rear portion 64 of the spool. Fluid tight seals between the back shell 40 and the spool 62 are provided by O-rings 70 and 72 seated in annular grooves formed in the spool and back shell, respectively.

During the molding process, the rearward portion of the female outer conductor 52 is filled with epoxy and the spool 62 is formed. However, the forward portion of the forward socket 48 is left uncovered. A forwardly extending annular wall 74 of the epoxy is formed which extends concentrically around the forward socket 48 and against the interior wall of the conductor 52.

A cylindrical conductive contact band 76 is tightly fit within the forward end of the female outer conductor 52. When the probe 14 of the male unit is fully inserted into the female unit as illustrated in FIG. 3, the insertion terminal 22 fits tightly within the forward socket 48 and the forward conductive end 36 fits tightly within the contact band 76 to establish two separate conductive paths.

A cylindrical bladder support drum 78 (FIG. 2) made of a rigid dielectric material such as thermoset reinforced epoxy is tightly fit over the forward end of the female outer conductor 52. The bladder support drum 78 is only partially fit over the end of the female outer conductor 52. This drum has orifices 80 spaced around its circumference. A radially extending retaining flange 82 is integrally formed to the forward end of the drum 78.

A cylindrical or tube-like bladder 84 surrounds the forward end of the female outer conductor 52 and encloses the forward conductive socket 48 and the conductive contact band 76. The bladder is flexible and during assembly it is slightly compressed longitudinally which results in the corrugations illustrated in FIG. 2. The bladder 84 has an inwardly projecting annular lip 86 at its rearward end which fits over the retaining lip 68 of the spool 62. The forward end of the bladder has a pair of annular, inwardly projecting, longitudinally spaced lips 88 which fit over the retaining flange 82 of the bladder support drum 78.

The bladder/seal assembly is constructed so that there are only two sealing points between the fluid compound and the outside environment: one at the cylindrical sleeve 90 and the other at the rear lip 86. The cylindrical sleeve 90 (FIGS. 4–6) is integrally molded to the forward end of the bladder which extends axially within the body of the female unit, in alignment with the forward socket 48. The forward end of the sleeve consists of an annular anchor portion 92 whose diameter closely approximates the inside diameter of the receptacle 42 of the female unit. The anchor portion is positioned between the inner wall of the receptacle 42 and the outer wall of an inward, cylindrical projection 94 of the receptacle which defines the tapered opening 44 for the contact probe.

The sleeve 90 (FIG. 2) forms a portion of the seal assembly through which the contact probe 14 of the male unit is inserted. The bladder 84 is filled with a dielectric fluid. It is this seal which prevents loss of dielectric fluid or water leakage during insertion or withdrawal of the contact probe from the female unit, and also cleans the male probe during insertion.

The sleeve 90 and the bladder 84 are preferably integrally molded of an elastomeric material such as rubber. In its normal, relaxed condition, the inside diameter of the sleeve 90 is preferably significantly smaller than the outside diameter of the contact probe 14. Thus, the sleeve tightly seals against the variable cross-section of the contact probe as it is inserted into the female unit to prevent loss of dielectric fluid or water leakage. Preferably the walls of the sleeve 90 are relatively thin so that they can be compressed into a flat condition (FIG. 6) to provide a tight seal when the contact probe is withdrawn.

Besides the sleeve 90, as illustrated in FIG. 4, the seal penetrated by the contact probe further includes an elastomeric grommet 96 which surrounds the sleeve, a constricting ring 98 which surrounds the medical portion of the grommet and an elastomeric cover 100 which surrounds the constricting ring.

The constricting ring 98 is sized so that it is always under tension and squeezes the grommet down against the sleeve to close the same when the contact probe is withdrawn. In contrast to the cylindrical constrictor of the connector of my U.S. Pat. No. 4,373,767, the grommet 96 does not by itself have to compress and squeeze the sleeve shut. Instead, a significant portion of the force which squeezes the sleeve shut in provided by the elastomeric constricting ring 98 which is always under tension.

Referring to FIG. 4, the grommet 96 has a normally closed, flat slit 102 which extends axially therethrough in reference to FIG. 2. During assembly, the sleeve 90 and the anchor portion 92 are forced through this slit. Thus, the sleeve extends axially through the slit of the grommet. The grommet 96 has a main body portion 104 and a pair of radially extending flanges 106 on each end of the main body portion. The flanges and the main body portion of the grommet preferably have a diamond cross-section shape. By making the flanges and main body portion with a greater radial dimension perpendicular to the slit 102 than parallel to the slit, the squeezing force of the surrounding constricting ring is concentrated in a fashion which will insure that the sleeve 90 is squeezed shut when the contact probe is withdrawn therefrom.

As illustrated in FIG. 2, the constricting ring is positioned between the flanges 106 which serve to maintain the muscle in axial alignment. The flanges 106 (FIG. 4) have cutout regions 108 adjacent each end of the slit 102 to allow easier opening of the slit upon insertion of the probe through the sleeve. The regions 108 release stress when the probe is inserted. The sealed condition of the sleeve 90 is illustrated in FIG. 6. The constricting ring 98 (FIG. 4) is considerably thicker than the cover 100, the latter serving primarily as a device for protection from the environment.

As illustrated in FIG. 6, when the probe is withdrawn, the squeezing force of the constricting ring 98, transmitted through the grommet 96 pinches the sleeve 90 into a flat cross-section, thus closing the opening and preventing dielectric fluid or water from passing through the sleeve. It should be pointed out that the ability of the assembly illustrated in FIGS. 4-6 to provide a fluid-tight seal upon withdrawal of the contact probe does not depend upon any contact between the components of the assembly and the walls of the receptacle 42. Thus, close tolerances between the receptacle 42 and the seal assembly need not be maintained. This is an advantage over the constrictor and sleeve arrangement disclosed in my U.S. Pat. No. 4,373,767.

The reason that the constricting ring 98 is used in addition to the grommet is that rubber tends to take a compression set. So when the probe is removed from the slit 102 the grommet will take a little time to return to its original configuration. But the constricting ring is always under tension and the extent of its deformation is relatively small, so it doesn't tend to be set. The constricting ring snaps back immediately when the probe is moved to instantly close the slit. The constricting ring maintains the crimping action and the seal.

The seal of my invention provides a large hole for the probe which closes instantaneously upon withdrawal of the probe. This is accomplished through a geometry that ensures that minimal set occurs in the elastic material surrounding the hole. Not only are the elastic limits of the grommet 96 and constricting ring 98 not exceeded, they are not even approached. The grommet preferably has a slit and not a round hole and the grommet is shaped to facilitate squeezing the slit shut.

A retaining ring 112 surrounds the annular lip 86 at the rearward end of the bladder and is pressed against the same by the forward, externally threaded portion of the back shell 40, completing the rear seal. Completing the description of the female unit 12, the receptacle 42 (FIG. 2) has a plurality of radially extending vents 110 for exposing the dielectric filled bladder to external ambient conditions, which in an undersea environment consists of high pressure seawater. Relief channels 120 (FIG. 2) formed in the projection 94 defining the tapered opening for the contact permit seawater to flow freely onto the face of the female unit, insuring that no pressure gradient will build up between this area and the outside environment. Balancing pressure by venting in this way prevents the possibility of leakage due to any pressure differential between the interior and exterior of the connector. The rearward, externally threaded portion of the back shell can be either inserted through a hole in a bulkhead or molded over to form a termination in-line to a cable. In the bulkhead configuration, a retaining nut (not illustrated) may be screwed over the threaded rearward portion 116 to secure the same in position, or the threaded portion can be screwed directly into mating threads in the bulkhead or both. In this configuration, an annular shoulder 118 of the back shell 40 presses against one side of the bulkhead and the nut presses against the other side of the bulkhead. Because of the internal construction of the female unit, external pressure forces are transferred via the shoulder 56 on outer conductor 52, thru spool 62 and back shell 40 to the bulkhead in that particular configuration. The epoxy molding material forms a strong, nonporous bond between the various sub-assemblies and blocks the flow of water or dielectric fluid through the connector and into the cable, or into the bulkhead in the case of a bulkhead configuration.

A prototype of the first embodiment described herein, when used in the bulkhead configuration, was able to withstand high differential pressure across a bulkhead during tests. Differential pressures of up to 6,000 pounds per square inch were cycled repeatedly without failure.

In another configuration, the male and female units of the illustrated underwater coaxial connector may be connected in line with neither unit being secured to a bulkhead. The center conductor and ground conductor of a standard coaxial cable may be connected to the rearward end 54 of the female outer conductor 52 and to the rearward socket 48 in any conventional fashion.

There are some obvious viable alternatives to the construction just described:

(a) The contact probe of the first embodiment may have a cross-section other than circular. For example, it may have an oval cross-section.

(b) The tension of the constricting ring could be transmitted so as to close the sleeve via a configuration other than flat.

(c) Instead of an elastomeric band, the constricting ring could take the form of springs or some other means for providing a closing tension.

(d) The sleeve and grommet could be molded as a single integral part.

(e) The connector could be made of materials other than those specified herein.

(f) The tapered opening in the female unit for the contact probe could be formed in a removable end cap.

Means may be provided for securing the male and female units together once the probe are inserted.

Figure 7:
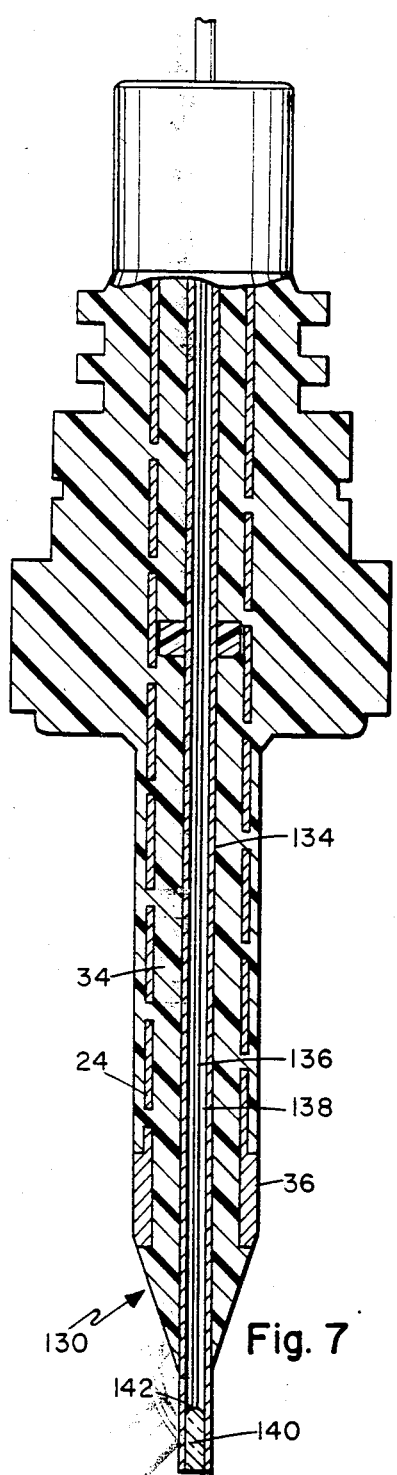
FIG. 7 is a cross-sectional view of the male unit of a second embodiment of my underwater connector which may be used to simultaneously provide electrical and fiber optic connections.
Figure 8:
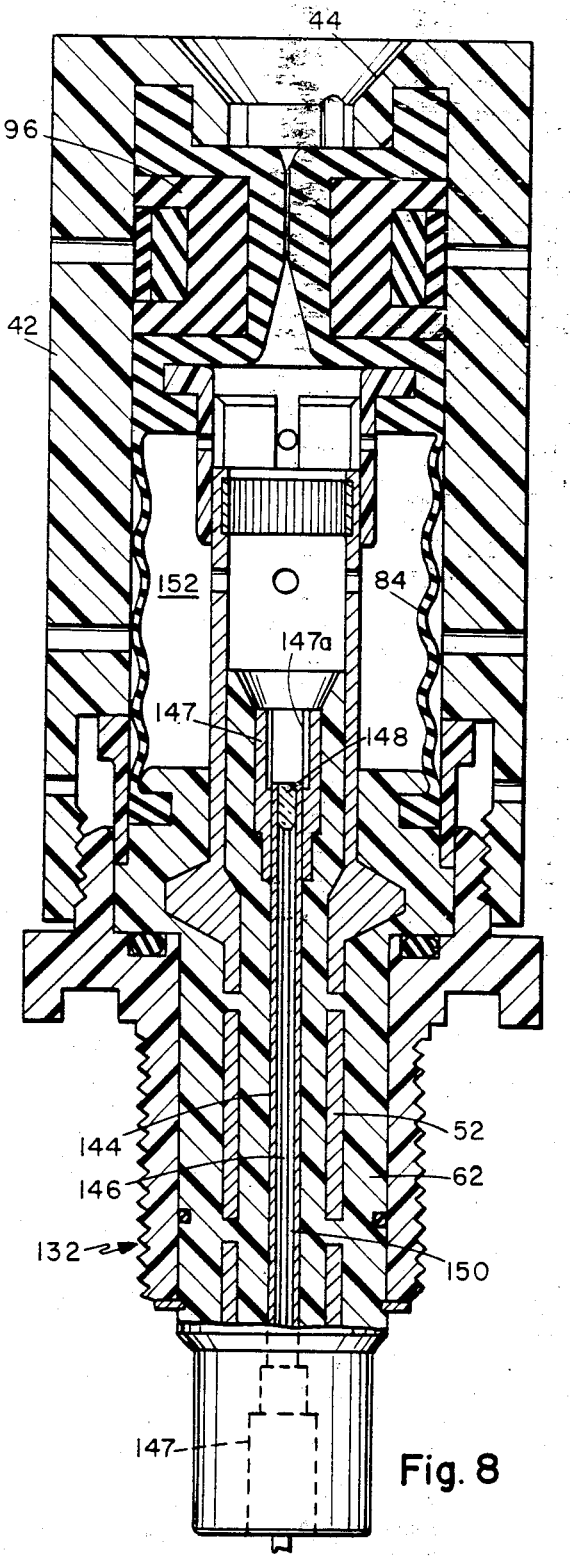
FIG. 8 is a cross-sectional view of the female unit of the second embodiment of my underwater connector.

FIGS. 7 and 8 illustrate the male and female units 130 and 132, respectively, of a second embodiment of my underwater connector which may be used to simultaneously provide electrical and fiber optic connections. The constructions of the male and female units 130 and 132 are similar to that of the corresponding male and female units of my first embodiment except as hereafter described. Referring to FIG. 7, the male unit 130 has a tubular metal housing 134 which extends concentrically within the outer conductor 24. The tubular metal housing 134 takes the place of the conductive rod 18 and the socket 20 (FIG. 1) of the first embodiment. A conventional optical fiber with surrounding jacket 136 extends concentrically within the tubular metal housing 134. The space between the optical fiber and the tubular metal housing is filled with epoxy 138 or other suitable compound for water blockage. A collimator lens 140 is mounted within the forward open end of the tubular metal housing 134. A focusing lens 142 connects the forward end of the optical fiber 136 to the collimator 140. Alternately, the collimator and focusing may be achieved by a single unit which performs both of these functions.

Referring to FIG. 8, the female unit 132 of my second embodiment has another tubular metal housing 144 in place of the conductive rod 46 (FIG. 2) of the first embodiment. An optical fiber and surrounding jacket 146 extends through the tubular metal housing 144. The space between the optical fiber 146 and the tubular metal housing 144 is filled with epoxy or other material 150 suitable for water blockage. The metal sockets 48 (FIG. 2) of the female unit of the first embodiment are replaced in the female unit 132 of the second embodiment (FIG. 8) with electrical sockets 147 having alignment ribs 147a. The forward end of the optical fiber 146 is connected to a second collimator/focusing lens arrangement 148 mounted within the forward one of the sockets 147. The female unit 132 of the second embodiment has a penetrable seal assembly similar to that of my first embodiment.

When the probe portion of the male unit 130 is inserted through the penetrable seal of the female unit 132, the forward end of the tubular metal housing 134 is received within the socket 147 at the forward end of the female unit. The alignment ribs 147a within the socket serve to hold the probe in alignment so that the collimator 140 of the male unit is precisely positioned in abutting end to end relationship with the collimator 148 of the female unit. The cylindrical contact band 76 engaging the forward end 36 of conductor 24 also serves to align the connection and the optical components. The bladder 84 of the female unit 132 is filled with a fluid 152 which has an optical index of refraction matched as closely as possible with that of the collimators 140 and 148.

When a signal is transmitted through the fiber 146 of the female unit, it exits that fiber into the collimator 148 which makes the light rays parallel. These parallel light rays enter the other collimator 140 and are focused by the lens 142 onto the end of the other fiber 136 within the male unit. Lens arrangements of this sort are now commercially available for standard (dry) connections. Two separate electrical path connections are also provided by the joined male and female units 130 and 132. Specifically, one electrical path consists of the tubular metal housing 134, the socket 147 at the forward end of the female unit, the tubular metal housing 144 and the socket 147 at the rearward end of the female unit. The other electrical path consists of the outer conductor 24 of the male unit which is in contact with the contact band 76 (FIG. 2) which is also in the female unit 132. This second electrical path further includes the outer conductor 52 in the female unit.

Having described preferred embodiments of my underwater connector, it should be understood that modifications and adaptations thereof will occur to those skilled in the art. For example, the electrical aspects of the second embodiment could be eliminated so that the device would serve solely as an underwater fiber optic connector. While one example of a fiber optic connection including a lens and collimators has been illustrated in my second embodiment, it will be understood that my underwater connector could accommodate a wide variety of known optical coupling means. Therefore the protection afforded my invention should be limited only in accordance with the scope of the following claims.

I claim:

1. An underwater connector, comprising:
a male unit having a probe;
a female unit having a hollow body and a forward opening for receiving the probe;
a flexible bladder positioned within the body of the female unit;
a seal mounted in the female body at a position adjacent the forward opening and having an elastomeric sleeve integrally molded to the bladder through which the probe will fit for insertion into the bladder, an elastomeric grommet surrounding the sleeve, and a constricting ring surrounding and squeezing the grommet and sleeve and holding the sleeve in closed condition upon withdrawal of the probe therefrom;

support means for holding said bladder and seal in position; and a socket in the body adjacent the opening and enclosed in the bladder for receiving the probe.

2. An underwater connector according to claim 1 wherein the body has vents for exposing the bladder to external ambient conditions.

3. An underwater connector according to claim 1 wherein the inside diameter of the sleeve is normally substantially smaller than the outside diameter of the probe so that the sleeve will seal tightly against the probe upon insertion thereof into the seal.

4. An underwater connector according to claim 1 wherein the grommet has a normally closed flat slit extending axially therethrough and the sleeve extends axially through the slit.

5. An underwater connector according to claim 1 wherein the grommet has a pair of spaced apart, radially extending flanges on each end of a main body portion for holding the constricting ring in axial alignment around the grommet.

6. An underwater connector according to claim 5 wherein the grommet has a normally closed flat slit extending axially through the flanges and main body portion and the sleeve extends axially through the slit, and further wherein the flanges and main body portion of the grommet have a greater radial dimension perpendicular to the slit than parallel to the slit to concentrate the force of the constricting ring on closing the slit.

7. An underwater connector according to claim 6 wherein the flanges have cut out regions adjacent each end of the slit to allow easier opening of the slit upon insertion of the probe through the seal, and to relieve strain on the flanges.

8. An underwater connector according to claim 6 wherein the flanges and main body portion of the grommet have a generally diamond shaped cross-section.

9. An underwater connector according to claim 1 wherein the seal further comprises an elastomeric cover surrounding and squeezing against the constricting ring.

10. An underwater connector according to claim 1 wherein the constricting ring comprises an elastomeric band which squeezes against the grommet.

11. An underwater connector according to claim 1 wherein the sleeve and grommet are integrally connected.

12. An underwater connector according to claim 1 wherein the probe includes a central conductive rod coaxially surrounded by a cylindrical outer conductor having a plurality of axially spaced holes therein, and a dielectric reinforcing material filling the outer conductor to maintain rigid concentricity between the rod and outer conductor and extending through the holes in the outer conductor to form a rigid base surrounding a rearward end of the outer conductor.

13. An underwater connector according to claim 1 wherein the body of the female unit has an externally threaded rearward portion for insertion through a bulkhead and for receiving a nut to secure the female unit to the bulkhead.

14. An underwater connector according to claim 1 wherein the probe has a round cross-section.

15. An underwater connector according to claim 1 wherein the probe has an oval cross-section.

16. An underwater connector, comprising:
a male unit having a probe;
a female unit having a hollow body;
a flexible bladder positioned within the body of the female unit for being filled with a fluid compound;
a seal positioned in the body and including an elastomeric sleeve integrally molded to the bladder through which the probe will slidably fit for insertion into the bladder, an elastomeric grommet having an axially extending main body portion and a pair of radially extending flanges on each end of the body portion, the body portion of the grommet having a normally closed, axially extending flat slit through which the sleeve extends, and an elastomeric constricting ring surrounding the main body portion of the grommet between the flanges and squeezing the main body portion of the grommet and the sleeve to hold the sleeve in a closed condition upon withdrawal of the probe therefrom;
support means holding said bladder and seal in position; and
a socket positioned in the body and enclosed in the bladder adjacent the sleeve for receiving the probe.

17. An underwater connector according to claim 16 wherein a quantity of a fluid compound fills the bladder and the body has vents for exposing the bladder to external ambient conditions.

18. An underwater connector according to claim 16 wherein the inside diameter of the sleeve is normally substantially smaller than the outside diameter of the probe so that the sleeve will seal tightly against the probe upon insertion thereof into the seal.

19. An underwater connector according to claim 16 wherein the flanges and main body portion of the grommet have a greater radial dimension perpendicular to the slit than parallel to the slit to concentrate the force of the constricting ring on closing the slit.

20. An underwater connector according to claim 16 wherein the flanges have cut-out regions adjacent each end of the slit to allow easier opening of the slit upon insertion of the probe through the seal, and to relieve strain on the flanges.

21. An underwater connector according to claim 19 wherein the flanges and main body portion of the grommet have a generally diamond shaped cross-section.

22. An underwater connector according to claim 16 wherein the seal further comprises an elastomeric cover surrounding and squeezing against the constricting ring.

23. An underwater connector according to claim 17 wherein the sleeve is integrally molded to one end of the flexible bladder, and the connector further comprises means for electrically connecting the socket through the other end of the bladder, and means for sealing the other end of the bladder to the connecting means and body.

24. An underwater coaxial connector, comprising:
a male unit having a conductive contact probe of circular cross-section;
a female unit having a hollow body with a forward opening for receiving the probe;
a bladder molded of an elastomeric material and positioned within the body;
a seal positioned in the body and having an elastomeric sleeve adjacent said opening through which the contact probe will slidably fit, the sleeve being integrally molded to one end of the bladder and having an inside diameter which is normally substantially smaller than the outside diameter of the contact probe so that the sleeve will seal tightly against the contact probe upon insertion thereof through the sleeve, the seal further including an elastomeric grommet having an axially extending main body portion and radially extending flanges integrally formed on each end thereof, the main body portion and flanges of the grommet having a normally closed, axially extending flat slip through which the sleeve extends, the flanges and main body portion of the grommet having greater radial dimension perpendicular to the slip than parallel to the slit, and an elastomeric constricting ring surrounding the main body portion of the grommet between the flanges and squeezing the grommet and sleeve to hold the sleeve in closed condition upon withdrawal of the contact probe therefrom to prevent movement of fluid between the exterior of the female unit and the interior of the bladder;

support means for holding said bladder and said seal in position; and a conductive socket in the body of the female unit and enclosed in the bladder adjacent said sleeve for receiving the contact probe to provide a signal connection.

25. An underwater fiber optic connector comprising:
an elongate male unit having a probe for holding a first optical fiber extending longitudinally therethrough;

an elongate female unit having a hollow body portion and means for holding a second optical fiber extending longitudinally through a remaining portion of the female unit;

a socket in the hollow body portion for receiving the probe and holding one end of the second optical fiber;

a flexible bladder positioned within the body of the female unit and enclosing the means for holding the second fiber and the socket;

an elastomeric, watertight seal, integral with said bladder and adjacent said socket, for being penetrated by the probe; and optical coupling means in the probe and socket for permitting light signals to be transmitted between the first and second optical fibers when the probe is received in the socket.

26. An underwater fiber optic connector according to claim 25 wherein the seal includes an elastomeric sleeve formed in the bladder and held in the hollow body portion to be penetrated by the probe, an elastomeric grommet surrounding the sleeve, and a constricting ring surrounding and squeezing the grommet and sleeve and holding the sleeve in a closed condition upon withdrawal of the probe therefrom.

27. An underwater fiber optic connector according to claim 26 wherein the bladder contains a quantity of a fluid having substantially the same optical index of refraction as the optical coupling means, and the body portion has vents for exposing the bladder to external ambient conditions.

28. An underwater fiber optic connector according to claim 26 wherein the inside diameter of the sleeve is normally substantially smaller than the outside diameter of the probe so that the sleeve will seal tightly against the probe upon insertion thereof into the seal.

29. An underwater fiber optic connector according to claim 26 wherein the grommet has a normally closed flat slit extending axially therethrough and the sleeve extends axially through the slit.

30. An underwater fiber optic connector according to claim 26 wherein the grommet has a pair of spaced apart, radially extending flanges on each end of a main body portion for holding the constricting ring in axially alignment around the grommet.

31. An underwater fiber optic connector according to claim 30 wherein the grommet has a normally closed flat slit extending axially through the flanges and main body portion and the sleeve extends axially through the slit, and further wherein the flanges and main body portion of the grommet have a greater radial dimension perpendicular to the slit than parallel to the slit to concentrate the force of the constricting ring on closing the slit.

32. An underwater fiber optic connector according to claim 31 wherein the flanges have cut-out regions adjacent each end of the slit to allow easier opening of the slit upon insertion of the probe through the seal, and to relieve strain on the flanges.

33. An underwater fiber optic connector according to claim 31 wherein the flanges and the main body portion of the grommet have a generally diamond shaped cross-section.

34. An underwater fiber optic connector according to claim 26 wherein the seal further comprises an elastomeric cover surrounding and squeezing against the constricting ring.

35. An underwater fiber optic connector according to claim 26 wherein the constricting ring comprises an elastomeric band which squeezes against the grommet.

36. An underwater fiber optic connector according to claim 26 wherein the sleeve and grommet are integrally connected.

37. An underwater fiber optic connector according to claim 25 wherein the probe has a round cross-section.

38. An underwater fiber optic connector according to claim 25 wherein the optical coupling means includes a first collimator and focusing means mounted in the probe of the male unit and connected to one end of the first optical fiber, and a second collimator means mounted in the socket of the female unit and connectable to the one end of the second optical fiber, so that when the probe of the male unit is received in the socket of the female unit, the first and second collimators are in axially aligned contact.

39. An underwater fiber optic connector according to claim 25 and further comprising means for providing at least one electrical connection upon insertion of the probe of the male unit into the hollow body portion of the female unit.

40. An underwater fiber optic connector according to claim 39 wherein the electrical connection is established by mating contact between a conductive portion of the probe of the male unit and a conductive portion of the socket of the female unit.

41. An underwater connector, comprising:
a male unit having an elongate probe with a forward end;

a hollow female unit having a forward opening for receiving said probe;

a flexible bladder positioned in said female unit;

a socket mechanism held in said female unit and supporting a socket enclosed in said bladder adjacent said forward opening for receiving the forward end of said probe;

a normally-closed, watertight seal formed in said bladder to be penetrable by said probe and held in said female unit at a position adjacent said forward opening; and support means for holding said bladder and said seal in position.

42. A connector according to claim 41 wherein said seal includes:

an elastomeric, substantially cylindrical sleeve integrally molded in said bladder through which said probe slidably fits;

an elastomeric grommet having an axially extending main body portion with an axially-extending slit through which said sleeve extends and a pair of radially-extending flanges on each end of the body portion; and an elastomeric constricting ring surrounding the main body portion of the grommet between the flanges and squeezing the axially-extending slit and the sleeve to close the sleeve upon withdrawal of the probe therefrom.

43. A connector according to claim 41 further including electro-optical means in said probe and electro-optical means in said socket for, when said probe is received in said socket, simultaneously conducting electrical signals and optical signals between said male and female units.

* * * * *

UNITED STATES PATENT AND TRADEMARK OFFICE
CERTIFICATE OF CORRECTION

PATENT NO. : 4,606,603

DATED : August 19, 1986

INVENTOR(S) : James L. Cairns

It is certified that error appears in the above-identified patent and that said Letters Patent is hereby corrected as shown below:

Column 12, line 38, Claim 38, delete "connected" and substitute therefor --connectable--.

Signed and Sealed this

Twentieth Day of January, 1987

Attest:

DONALD J. QUIGG

Attesting Officer

Commissioner of Patents and Trademarks